US009968875B2

(12) United States Patent
Gabrielsson et al.

(10) Patent No.: US 9,968,875 B2
(45) Date of Patent: May 15, 2018

(54) FILTER SEGMENT WITH A LIGHT WEIGHT FRAME

(75) Inventors: Karl P. Gabrielsson, Saltsjö-Boo (SE); Tony I. Bjorkenius, Vendelso (SE); Gregory G. Gilmore, Nashua, NH (US)

(73) Assignee: GL&V Luxembourg S.a.r.l., Munsbach (LU)

( * ) Notice: Subject to any disclaimer, the term of this patent is extended or adjusted under 35 U.S.C. 154(b) by 0 days. days.

(21) Appl. No.: 14/241,624

(22) PCT Filed: Aug. 25, 2012

(86) PCT No.: PCT/US2012/052410
§ 371 (c)(1),
(2), (4) Date: Feb. 27, 2014

(87) PCT Pub. No.: WO2013/032958
PCT Pub. Date: Mar. 7, 2013

(65) Prior Publication Data
US 2014/0197093 A1    Jul. 17, 2014

Related U.S. Application Data

(60) Provisional application No. 61/528,386, filed on Aug. 29, 2011.

(51) Int. Cl.
*B01D 25/38*        (2006.01)
*B01D 35/28*        (2006.01)
(Continued)

(52) U.S. Cl.
CPC ............. *B01D 35/28* (2013.01); *B01D 33/23* (2013.01); *B01D 2201/0423* (2013.01);
(Continued)

(58) Field of Classification Search
None
See application file for complete search history.

(56) References Cited

U.S. PATENT DOCUMENTS 1,812,725 A * 6/1931 Stanley et al. ................. 140/109
2,506,189 A * 5/1950 Attridge ................ A63F 9/1044
273/157 R
(Continued)

FOREIGN PATENT DOCUMENTS

WO    87/04640 A1    8/1987
WO    94/26389 A1    11/1994
(Continued)

OTHER PUBLICATIONS

Suntuf, Installation Guide of Corrugated Polycarbonate Panels, Apr. 15, 2010, pp. 1-16.*

*Primary Examiner* — Bobby Ramdhanie
*Assistant Examiner* — Michael J An
(74) *Attorney, Agent, or Firm* — James Earl Lowe, Jr.

(57) ABSTRACT

A disc segment adapted to be attached to other disc segments to form a disc assembly, the disc segment including an isosceles trapezoid frame. The frame comprises a left side rail and a right side rail, and a plurality of spaced apart parallel horizontally extending ribs connected between the side rails. The frame defines a first disc side and an opposite second disc side, each disc side including a corrugated left bottom clamp list adjacent the left side rail and supported by the ribs, and a corrugated right bottom clamp list adjacent the right side rail and supported by the ribs. Each disc side also includes a corrugated wire mesh supported by the left and right clamp lists, and supported by the frame ribs.

20 Claims, 11 Drawing Sheets

(51) Int. Cl.
  *B01D 33/23* (2006.01)
  *D21C 9/06* (2006.01)
(52) U.S. Cl.
  CPC .... *B01D 2201/127* (2013.01); *B01D 2201/40* (2013.01); *B01D 2201/4015* (2013.01); *D21C 9/06* (2013.01)

(56) References Cited

U.S. PATENT DOCUMENTS

| | | | | |
|---|---|---|---|---|
| 3,485,376 A | * | 12/1969 | Peterson et al. | 210/331 |
| 3,610,419 A | * | 10/1971 | Vallee | D21D 5/02 |
| | | | | 210/326 |
| 4,159,951 A | * | 7/1979 | Davis | 210/331 |
| 4,950,403 A | * | 8/1990 | Hauff | D21C 9/18 |
| | | | | 209/403 |
| 5,238,564 A | * | 8/1993 | Luthi | B01D 33/23 |
| | | | | 210/331 |
| 5,766,466 A | * | 6/1998 | Peterson | B01D 33/23 |
| | | | | 119/508 |
| 6,790,357 B2 | * | 9/2004 | Norell | 210/345 |
| 7,004,989 B2 | * | 2/2006 | Karlsson | B01D 46/10 |
| | | | | 55/497 |
| 2005/0000887 A1 | * | 1/2005 | Scheucher | B01D 33/23 |
| | | | | 210/486 |
| 2005/0121381 A1 | * | 6/2005 | Sheets et al. | 210/331 |
| 2009/0020483 A1 | * | 1/2009 | Davis | B01D 33/0093 |
| | | | | 210/784 |
| 2012/0012519 A1 | * | 1/2012 | Altwies | B01D 29/012 |
| | | | | 210/489 |

FOREIGN PATENT DOCUMENTS

| | | | |
|---|---|---|---|
| WO | 2008/021270 A2 | 2/2008 | |
| WO | 2010/110976 A1 | 9/2010 | |
| WO | WO 2010110976 A1 * | 9/2010 | B01D 33/23 |

\* cited by examiner

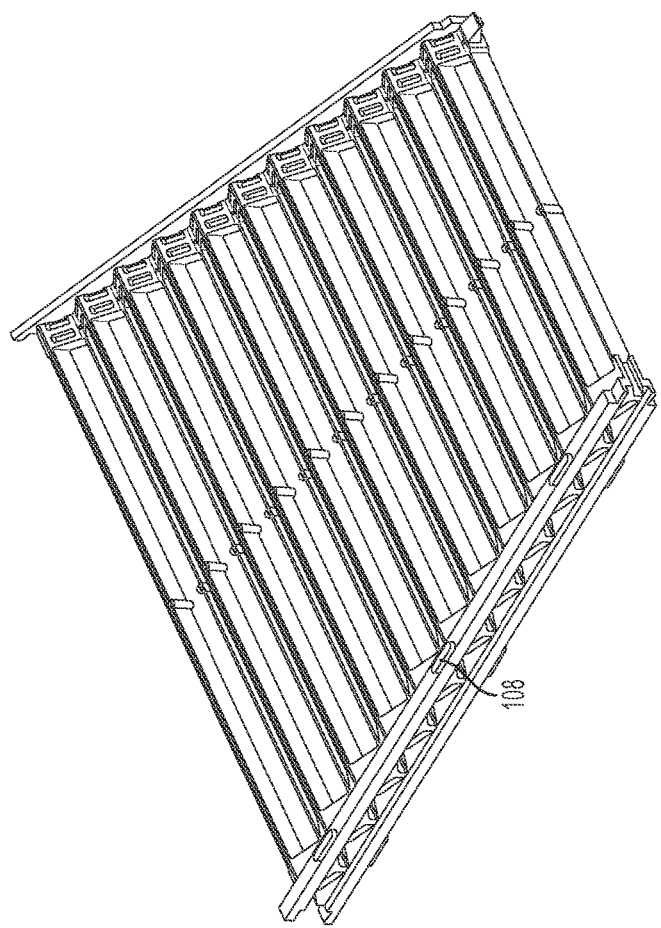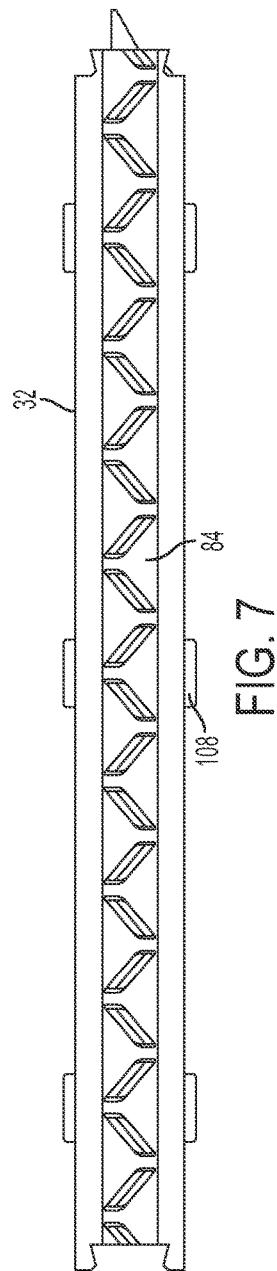

FILTER SEGMENT WITH A LIGHT WEIGHT FRAME

This application is a 35 U.S.C. 371 application from PCT Application PCT/US12/52410 filed Aug. 25, 2012 which claims the benefit of U.S. Provisional Patent Application 61/528,386 filed Aug. 29, 2011. This application therefore claims the benefit of PCT Application PCT/US12/52410 filed Aug. 25, 2012, and U.S. Provisional Patent Application 61/528,386 filed Aug. 29, 2011.

TECHNICAL FIELD

This disclosure relates to a disc assembly used as a filter in a processing operation, and, more particularly, to improvements thereto.

DISCLOSURE OF INVENTION

Technical Problem

The disc assembly according to this disclosure may be utilized in connection with any liquid medium, comprising various liquids, suspensions, etc. containing constituents desired to be filtered away, but it is especially beneficial when used to dewater fiber suspensions, especially cellulose fibers.

Although disc assemblies used for this purpose are well known, their construction is heavy and hard to manufacture.

It is desirable to have a disc assembly made of a lighter material, easy to manufacture and assemble.

Technical Solution

A disc segment adapted to be attached to other disc segments to form a disc assembly, the disc segment including an isosceles trapezoid frame. The frame comprises a left side rail and a right side rail, and a plurality of spaced apart parallel horizontally extending ribs connected between the side rails. The frame defines a first disc side and an opposite second disc side, each disc side including a corrugated left bottom clamp list adjacent the left side rail and supported by the ribs, and a corrugated right bottom clamp list adjacent the right side rail and supported by the ribs. Each disc side also includes a corrugated wire mesh supported by the left and right clamp lists, and supported by the frame ribs.

A left corrugated top clamp list is adjacent the left side rail and attached to the frame, sandwiching the wire mesh between the left bottom clamp list and the left top clamp list, and a right corrugated top clamp list is adjacent the right side rail and attached to the frame, sandwiching the wire mesh between the right bottom clamp list and the right top clamp list.

Advantageous Effects

This disc segment is lighter than conventional disc segments, and easier to manufacture.

DESCRIPTION OF DRAWINGS

FIG. 6 is a perspective view of a frame according to this disclosure.

FIG. 7 is a side view of the left side rail of the frame shown in FIG. 6.

Figure 1:
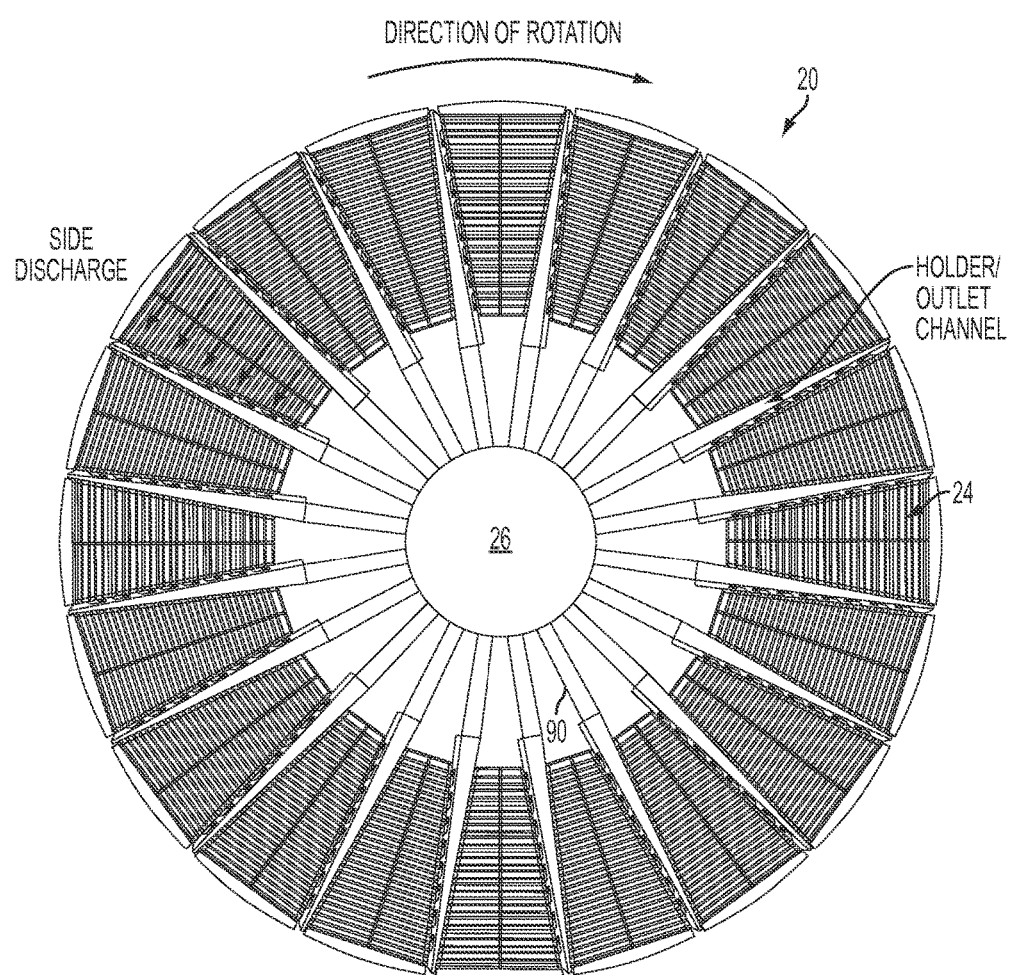
FIG. 1 is a side view of a disc assembly according to this disclosure.

Before one embodiment of the disclosure is explained in detail, it is to be understood that the disclosure is not limited in its application to the details of the construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Further, it is to be understood that such terms as "forward", "rearward", "left", "right", "upward" and "downward", etc., are words of convenience and are not to be construed as limiting terms.

More particularly, throughout this description and claims, a disc segment is described as including left and right. In alternate embodiments, the sides can be reversed. For example, the left side may be on the right, and the right side may be on the left, and so on. The description and claims also refer to top and bottom, which is dependent on the orientation. Top and bottom as used herein mean that in some possible orientations of the disc segment, one element is below or above another.

BEST MODE

As illustrated in the drawings, this disclosure provides a disc assembly 20 (see FIG. 1) including a plurality of disc segments 24 attached to one another to form a disc, and a central hub 26. Such disc assemblies are most often used as filters in a pulp processing operation, such as the one disclosed in U.S. Vore Pat. No. 3,331,512; which is incorporated herein by reference.

Figure 2:
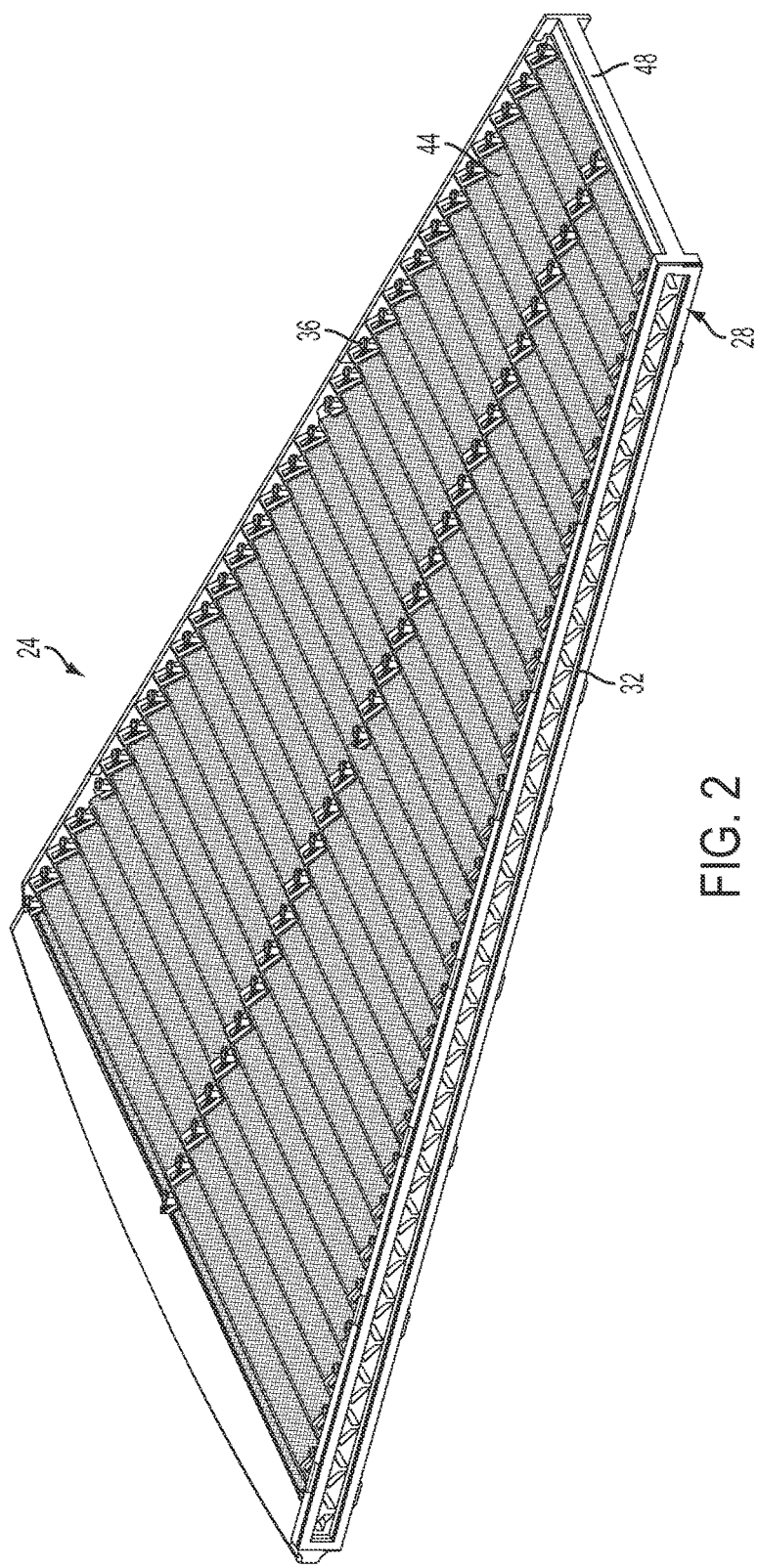
FIG. 2 is a perspective view of an assembled disc segment according to this disclosure.
Figure 3:
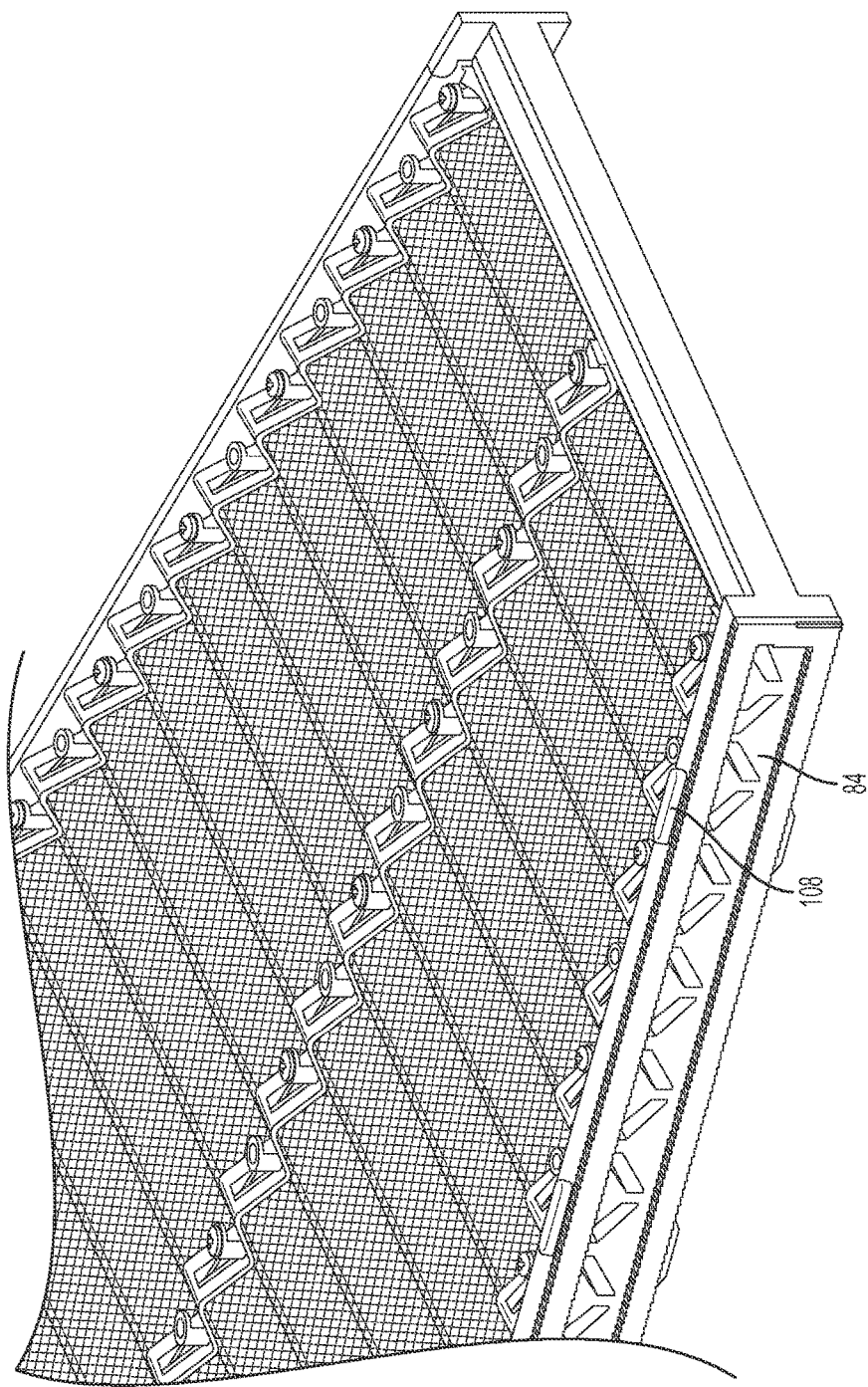
FIG. 3 is an enlarged view of the bottom end of the disc segment shown in FIG. 2.
Figure 4:
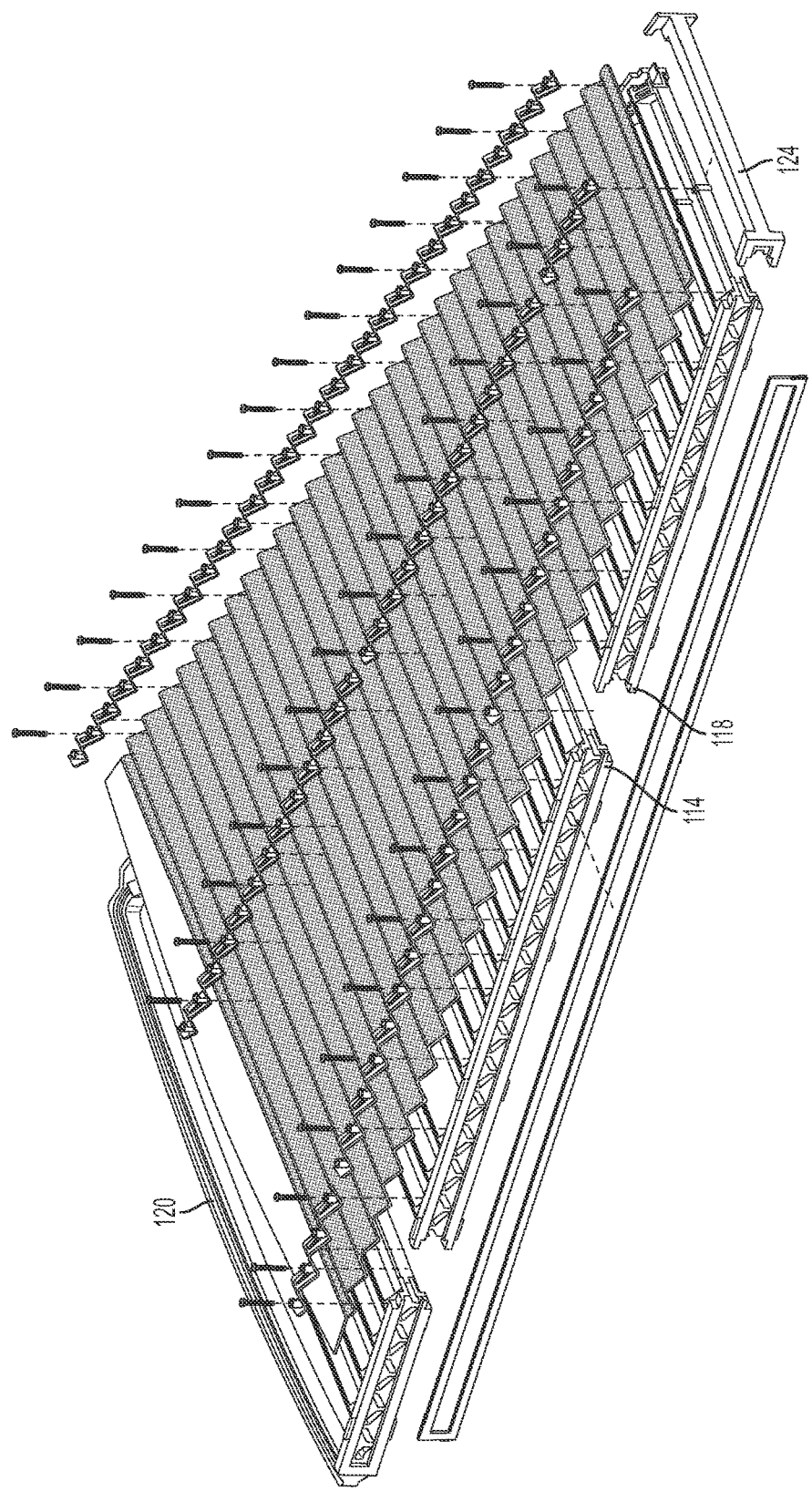
FIG. 4 is an exploded perspective view of the disc segment of FIG. 2, with only one side of the disc segment being shown, the opposite side having been removed to simplify this illustration.
Figure 5:
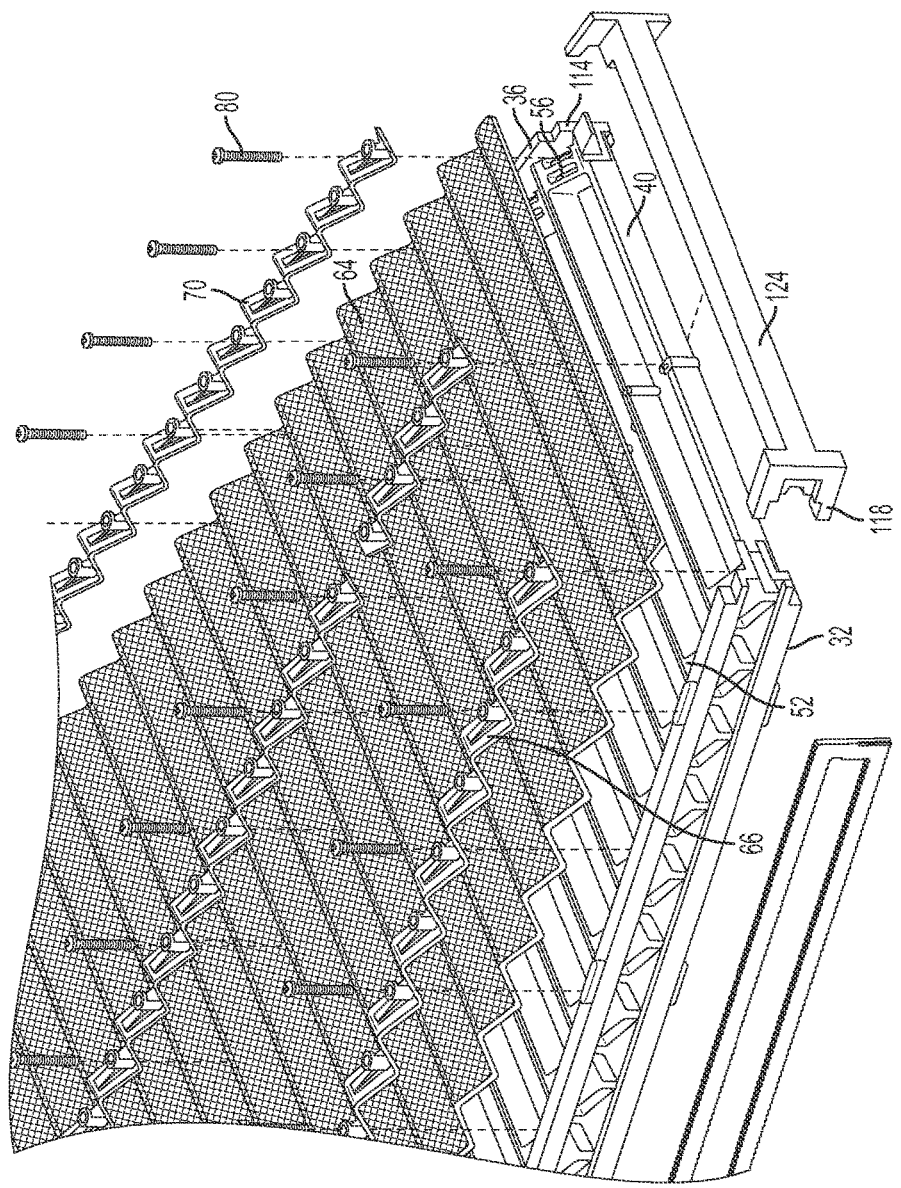
FIG. 5 is an enlarged view of the bottom end of the disc segment shown in FIG. 4.

Each disc segment 24, as shown in FIGS. 3 and 5, includes an isosceles trapezoid frame 28, the frame 28 comprising a left side rail 32 and a right side rail 36, and a plurality of spaced apart parallel horizontally extending ribs 40 connected between the side rails. The frame 28, as shown in FIG. 2, defines a first disc side 44 and an opposite second disc side 48. As shown in FIGS. 4, 5 and 6, each disc side includes a corrugated left bottom clamp list 52 adjacent the left side rail 32 and supported by the ribs 40, and a corrugated right bottom clamp list 56 adjacent the right side rail 36 and supported by the ribs 40.

As illustrated in FIG. 5, a corrugated wire mesh 64 is supported by the left, central and right clamp lists, and supported by the frame ribs. A left corrugated top clamp list 66 is placed adjacent the left side rail 32, and preferably over the left corrugated bottom clamp list 52, and then attached to the frame 28, sandwiching the wire mesh 64 between the left bottom clamp list 52 and the left top clamp list 66. In a similar fashion, a right corrugated top clamp list 70 is placed adjacent the right side rail 36 and attached to the frame 28, sandwiching the wire mesh 64 between the right bottom clamp list 56 and the right top clamp list 70. A corrugated central top clamp list 74 is also placed over the wire mesh 64, and attached to the frame 28.

Figure 10:
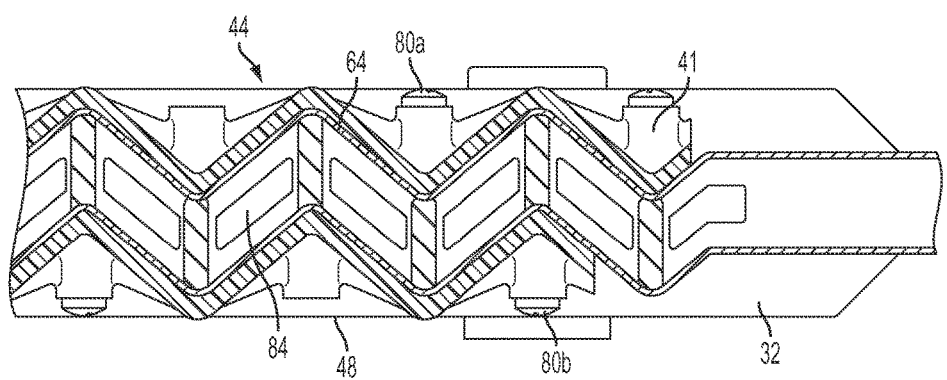
FIG. 10 is a cross sectional view of the disc segment taken along the line 10 #10 in FIG. 9.

A plurality of spaced apart screws 80 attaches the clamp lists to the frame 28. In the preferred embodiment, the screws 80 are self-taping screws, but in other embodiments, other means for securing the lists to the ribs, can be used. Further, in the preferred embodiment, as illustrated in FIG. 10, a first screw 80a on a first disc side 44 is attached to a rib 40, and a second screw 80b on the second disc side 48 is attached to the rib 40 spaced apart from the first screw 80a, thus staggering along the length of the frame the screw locations along one side and the other of the disc segment, as shown in FIG. 10. In order to enhance the ability of the screws 80 to be attached to the ribs 40, cylindrical seats 41 are formed in the ribs 40, and receive the screws 80.

The respective clamp lists space the first disc side wire mesh from the second disc side wire mesh, forming an open area 84 between the ribs 40. Filtrate passing though the wire mesh 64 is able to travel along the ribs 40 and between the clamp lists to the left side rail 32.

Figure 8:
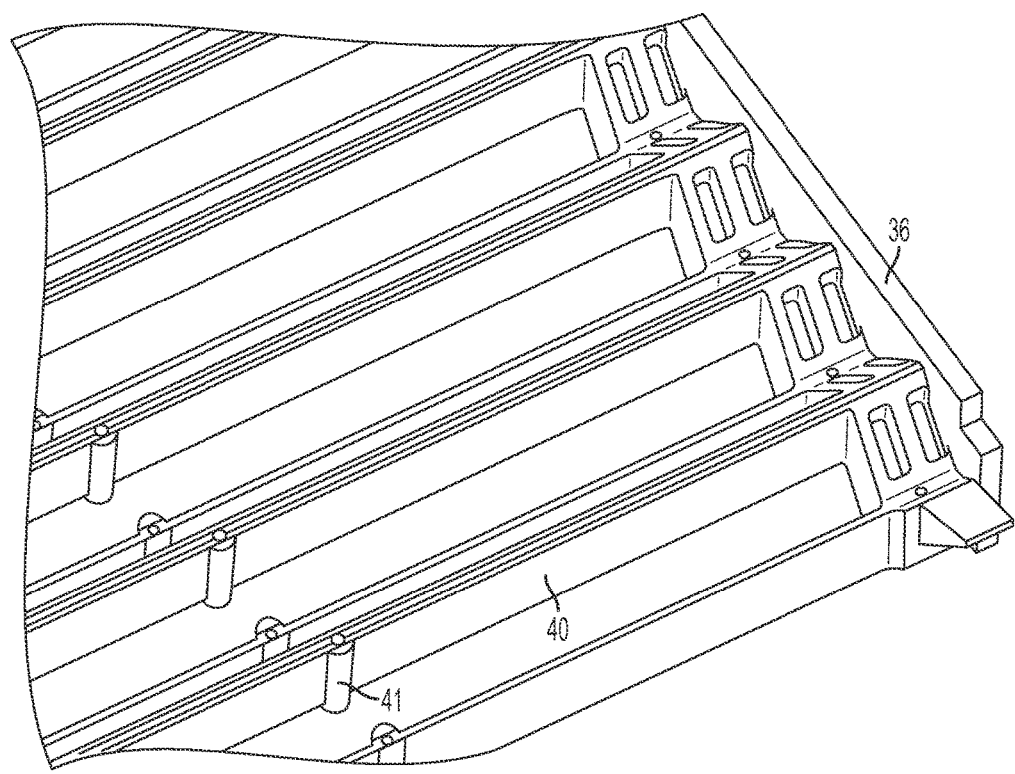
FIG. 8 is an enlarged view of the bottom right end of the frame shown in FIG. 7.
Figure 9:
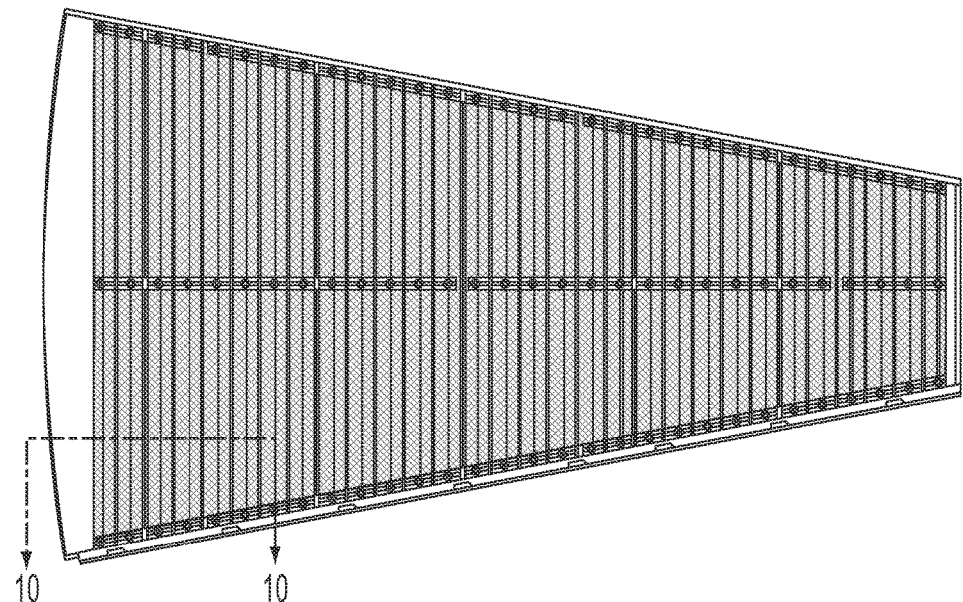
FIG. 9 is a top view of the disc segment of FIG. 2.

In the preferred embodiment, the right side rail 36 comprises a solid rectangular frame (see FIG. 8), and the left side rail 32 comprises an open rectangular frame (see FIGS. 6, 7 and 10) that allows filtrate to pass through the left side rail 32. As shown in FIG. 1, the left side of the disc segment is the drainage side of the disc segment 24.

In the preferred embodiment, the frame is made of plastic, the plastic aiding in the frames providing a lightweight disc segment 24 with ample structural support and rigidity.

Figure 11:
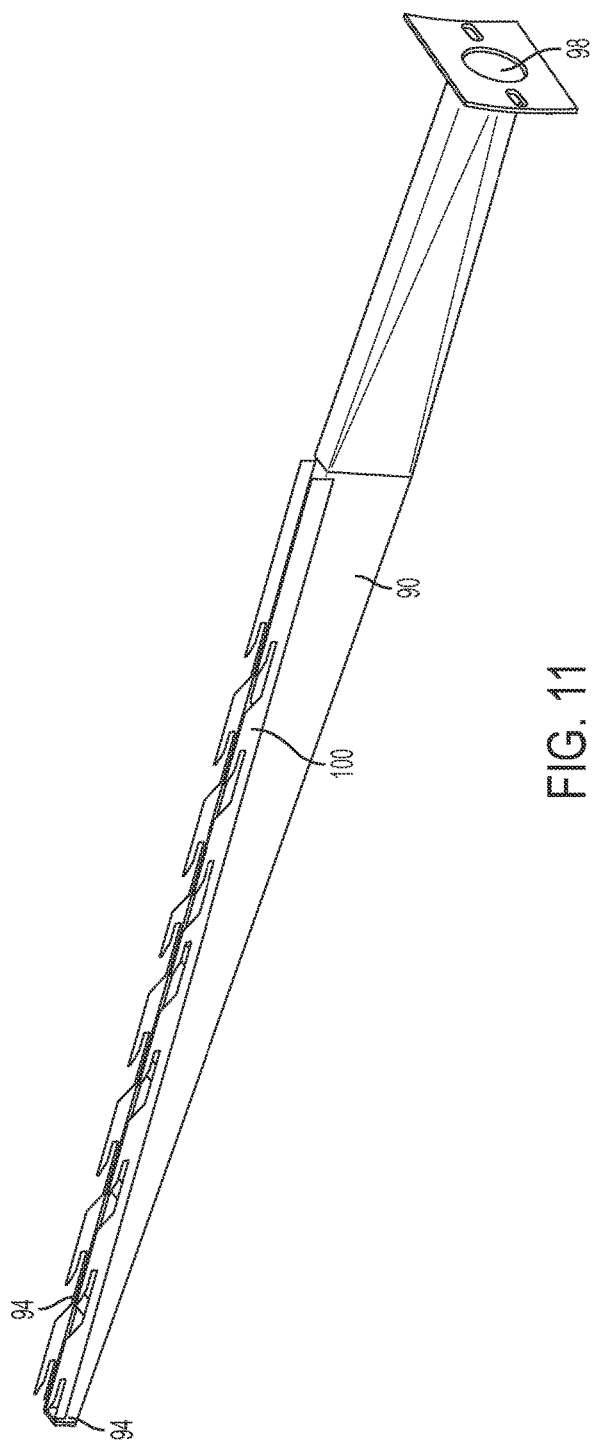
FIG. 11 is a perspective view of a collection tube according to this disclosure.
Figure 12:
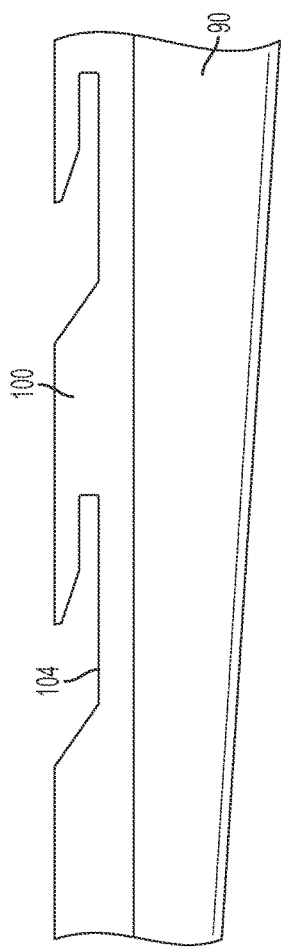
FIG. 12 is a partial enlarged view of a portion of the side of the collection tube.

As illustrated in FIGS. 1 and 11, the disc segment 24 further includes an outlet channel or collection tube 90 attached to the disc segment 24, each respective disc segment outlet channel 90 in turn being attached to the central hub 26. More particularly, the outlet channel 90 is attached to the left side rail 32, and the outlet channel 90 is in the form of an elongated tube. The outlet channel 90 has a open side 94 shaped to mate with the open rectangular frame of the left side rail 32. The outlet channel 90 further has a closed end 94 and an open end 98, and the open end 98 is adapted to be attached to a central hub in a conventional manner so that filtrate can pass through the outlet channel 90 to the central hub 26.

Figure 13:
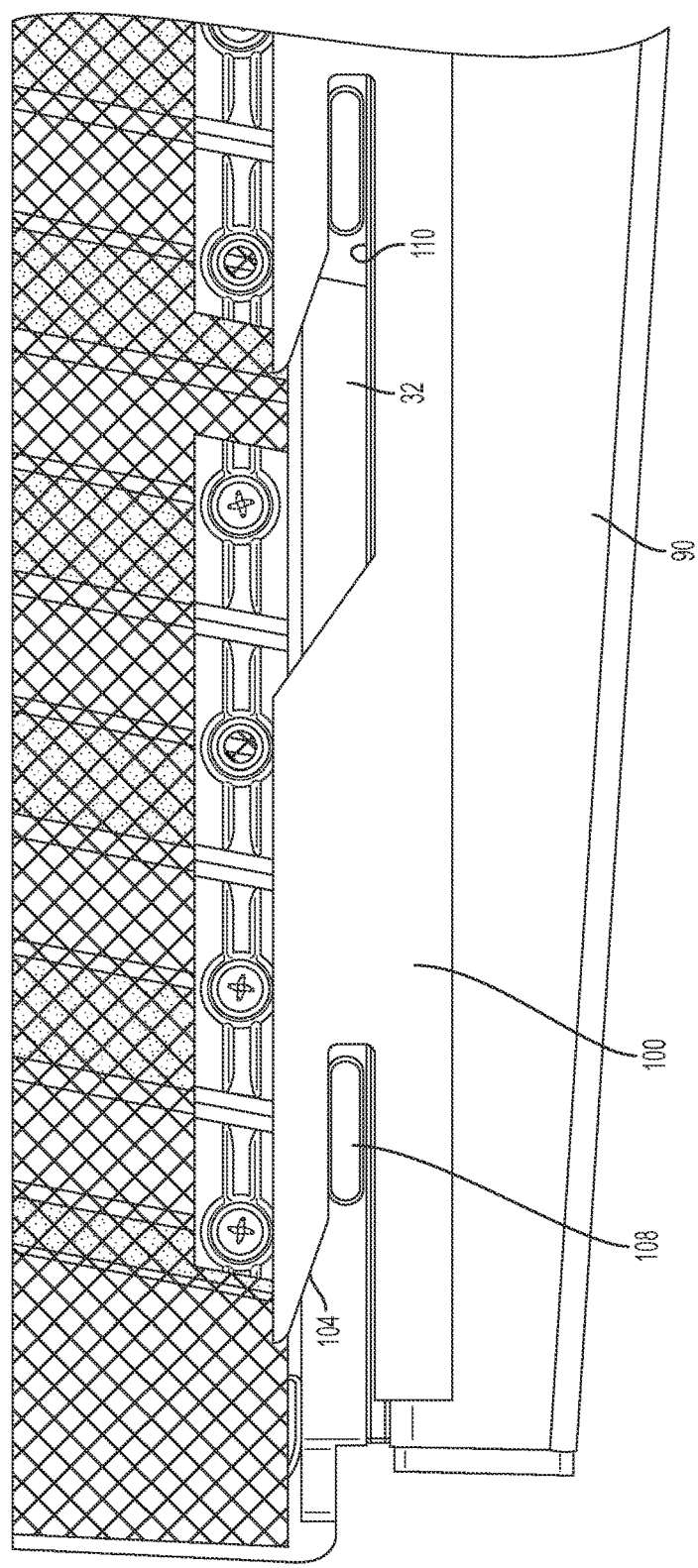
FIG. 13 is a partial enlarged top view of the assembled disc assembly and collection tube.

The outlet channel 90 is attached to the left side rail 32 in a manner that facilitates its assembly. More particularly, the outlet channel 90 further includes flanges 100 with slotted openings 104, the flanges 100 extending from the open side 94. The flanges 100 are adapted to extend toward and around the left side rail 32, as explained hereafter. The left side rail 32 includes spaced apart protrusions 108 that extend from the top and bottom of the open rectangular frame and coplanar with the frame, and are spaced so as to be aligned with the flange slotted openings 104, so that the outlet channel 90 can be attached to the left side rail 32 by having the protrusions 108 enter the slotted openings 104, as shown in FIG. 13, then travel along the slotted openings to a flat 110 in the flange 100 at the bottom end of the slotted opening 104, where the outlet channel 90 is then adjacent the left side rail 32, and fixed relative thereto.

Figure 14:
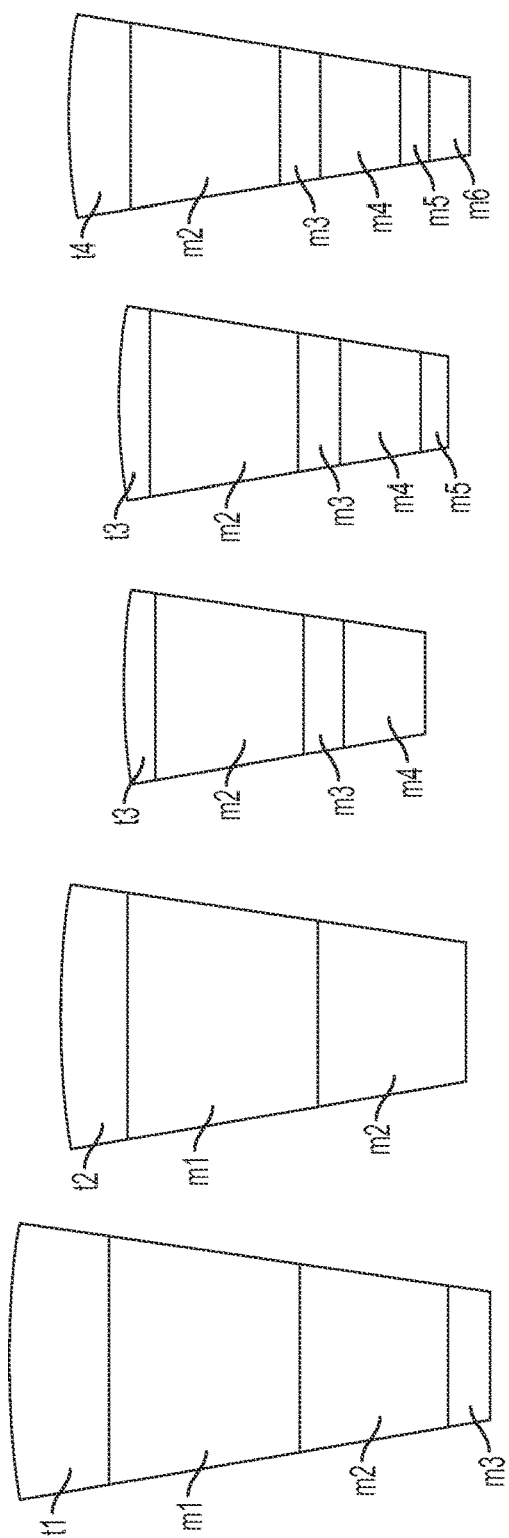
FIG. 14 is a schematic view of a number of different size disc assembles formed from a variety of different frames according to this disclosure.

In order to allow just a few parts to create a variety of frame sizes, and to ease the manufacture of the plastic frames, each disc segment 24 includes a plurality of frames attached to one another, the assembled frames forming an isosceles trapezoid disc segment, as illustrated in FIGS. 2 and 14. The plurality of frames are attached to one another by a dovetail joint (see FIG. 5) by providing the bottom of each frame side rail with a pin 114, and the top of each frame side rail with a tail 118. The frame pin 114 is placed within the tail 118 to attach the frames together. In other embodiments (not shown), the location of the pin and tail can be reversed.

In order to complete the disc segment 24, the disc segment 24 further includes a top 120, and a bottom 124, as illustrated in FIG. 4, each including a elongated member similar to one of the ribs, with the ends extending at an angle to the elongated member, and having thereon a pin or tail for mating with the complimentary structure on the frame side end.

The invention claimed is:

1. A disc segment adapted to be attached to other disc segments to form a disc assembly, the disc segment being in the form of
   an isosceles trapezoid frame, the frame comprising
   a left side rail and a right side rail, and a plurality of spaced apart parallel horizontally extending ribs, each rib being attached to one side rail and then extending over to and being attached to the other side rail, the frame defining a first disc side and an opposite second disc side, with liquid being able to pass between the spaced apart ribs from one disc side to the other disc side, each disc side including
   a corrugated left bottom clamp list adjacent the left side rail and supported by the ribs, and
   a corrugated right bottom clamp list adjacent the right side rail and supported by the ribs,
   a corrugated wire mesh supported by the left and right clamp lists, and supported by the frame ribs,
   a left corrugated top clamp list adjacent the left side rail and attached to the frame, sandwiching the wire mesh between the left bottom clamp list and the left top clamp list, and
   a right corrugated top clamp list adjacent the right side rail and attached to the frame, sandwiching the wire mesh between the right bottom clamp list and the right top clamp list.

2. A disc segment according to claim 1, wherein the disc segment further includes a plurality of spaced apart screws for attaching the clamp lists to the frame.

3. A disc segment according to claim 2, wherein the screws are self taping screws.

4. A disc segment according to claim 2, wherein a first screw is on a first disc side and attached to a rib, and a second screw is on the second disc side and is attached to the rib spaced apart from the first screw.

5. A disc segment according to claim 1, wherein the frame is made of plastic.

6. A disc segment according to claim 1, wherein the left side rail comprises an open rectangular frame.

7. A disc segment according to claim 6, wherein the disc segment further includes an outlet channel attached to the left side rail.

8. A disc segment according to claim 7, wherein the outlet channel is an elongated tube, the tube having an open side shaped to mate with the open rectangular frame of the left side rail, a closed end and an open end, the open end being adapted to be attached to a central hub so that filtrate can pass through the outlet channel to the central hub.

9. A disc segment according to claim 7, wherein the outlet channel is attached to the left side rail by the outlet channel tube further includes flanges with slotted openings, the flanges extending from the open side and being adapted to extend toward and around the left side rail, the left side rail including spaced apart protrusions from the open rectangular frame, coplanar with the frame, and aligned with the flange slotted openings, so that the outlet channel can be attached to the left side rail by having the protrusions enter the slotted openings, then travel along the slotted openings to a flat in the flange at the end of the slotted opening, where the outlet channel is then adjacent the left side rail, and fixed relative thereto.

10. A disc segment according to claim 6, wherein the respective clamp lists space the first disc side wire mesh from the second disc side wire mesh, forming an open area between the ribs, filtrate passing though the wire mesh being able to travel along the ribs and between the clamp lists to the left side rail.

11. A disc segment according to claim 1, wherein the right side rail comprises a solid rectangular frame.

12. A disc segment according to claim 1, wherein the disc segment includes a plurality of frames attached to one another, the assembled frames forming an isosceles trapezoid disc segment.

13. A disc segment according to claim 6, wherein each of the frames is attached to one another by providing the top of each frame side rail with a pin, and the bottom of each frame side rail with a tail, so that the frame pin can be placed within the tail.

14. A disc segment according to claim 1, wherein the disc segment further includes a top, and a bottom, each including an elongated member similar to one of the ribs, with ends extending at an angle to the elongated member, and having thereon one of a pin and a tail for mating with a complimentary structure on the frame side end.

15. A disc segment adapted to be attached to other disc segments to form a disc assembly, the disc segment being in the foul' of
an isosceles trapezoid frame, the frame being made of plastic and comprising
a left side rail in the form of an open rectangular frame, and a right side rail in the form of a solid rectangular frame, the left and right side rails each being adapted to be connected to the side rails of another one of this disc segment, and a plurality of spaced apart parallel horizontally extending ribs, each rib being attached to one side rail and then extending over to and being attached to the other side rail, the frame defining a first disc side and an opposite second disc side, with liquid being able to pass between the spaced apart ribs from one disc side to the other disc side, each disc side including a corrugated left bottom clamp list adjacent the left side rail and supported by the ribs, and
a corrugated right bottom clamp list adjacent the right side rail and supported by the ribs,
a corrugated wire mesh supported by the left and right clamp lists, and supported by the frame ribs,
a left corrugated top clamp list adjacent the left side rail and attached to the frame, sandwiching the wire mesh between the left bottom clamp list and the left top clamp list, and
a right corrugated top clamp list adjacent the right side rail and attached to the frame, sandwiching the wire mesh between the right bottom clamp list and the right top clamp list,
a plurality of spaced apart self taping screws for attaching the clamp lists to the frame, with a first screw on a first disc side and attached to a rib, and a second screw on the second disc side and is attached to the rib spaced apart from the first screw, and
an outlet channel attached to the left side rail, the outlet channel being an elongated tube, the tube having a open side shaped to mate with the open rectangular frame of the left side rail, a closed end and an open end, the open end being adapted to be attached to a central hub so that filtrate can pass through the outlet channel to the central hub.

16. A disc segment according to claim 15, wherein the outlet channel is attached to the left side rail by the outlet channel tube further includes flanges with slotted openings, the flanges extending from the open side and being adapted to extend toward and around the left side rail, the left side rail including spaced apart protrusions from the open rectangular frame, coplanar with the frame, and aligned with the flange slotted openings, so that the outlet channel can be attached to the left side rail by having the protrusions enter the slotted openings, then travel along the slotted openings to a flat in the flange at the end of the slotted opening, where the outlet channel is then adjacent the left side rail, and fixed relative thereto.

17. A disc segment according to claim 15, wherein the respective clamp lists space the first disc side wire mesh from the second disc side wire mesh, forming an open area between the ribs, filtrate passing though the wire mesh being able to travel along the ribs and between the clamp lists to the left side rail.

18. A disc segment according to claim 15, wherein the disc segment includes a plurality of frames attached to one another, the assembled frames forming an isosceles trapezoid disc segment.

19. A disc segment according to claim 15, wherein each of the frames is attached to one another by providing the top of each frame side rail with a pin, and the bottom of each frame side rail with a tail, so that the frame pin can be placed within the tail.

20. A disc segment according to claim 15, wherein the disc segment further includes a top, and a bottom, each including an elongated member similar to one of the ribs, with ends extending at an angle to the elongated member, and having thereon one of a pin and a tail for mating with a complimentary structure on the frame side end.

* * * * *